US012302053B2

(12) United States Patent
Bang et al.

(10) Patent No.: US 12,302,053 B2
(45) Date of Patent: *May 13, 2025

(54) MOBILE DEVICE, ELECTRONIC DEVICE AND ELECTRONIC SYSTEM FOR POWER LINE COMMUNICATION

(71) Applicant: Samsung Electronics Co., Ltd., Suwon-si (KR)

(72) Inventors: Sang Un Bang, Seongnam-si (KR); Yong Hwan Kim, Suwon-si (KR); Arom Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,730

(22) Filed: Oct. 2, 2023

(65) Prior Publication Data

US 2024/0031717 A1 Jan. 25, 2024

Related U.S. Application Data

(63) Continuation of application No. 17/584,888, filed on Jan. 26, 2022, now Pat. No. 11,818,531.

(30) Foreign Application Priority Data

Mar. 24, 2021 (KR) ........................ 10-2021-0037771
Jul. 20, 2021 (KR) ........................ 10-2021-0094596

(51) Int. Cl.
*H04R 1/10* (2006.01)

(52) U.S. Cl.
CPC .................................. *H04R 1/1025* (2013.01)

(58) Field of Classification Search
CPC ......................... H04R 1/1025; H04R 2420/07; H04R 1/1016; H02J 7/0044; H02J 50/10; H02J 50/80; H01F 38/14
See application file for complete search history.

(56) References Cited

U.S. PATENT DOCUMENTS

| | | | |
|---|---|---|---|
| 7,885,633 | B2 | 2/2011 | Schwager et al. |
| 9,461,705 | B2 | 10/2016 | Afkhami et al. |
| 9,667,315 | B2 | 5/2017 | Bonicatto et al. |
| 10,735,845 | B2 | 8/2020 | Lee et al. |
| 11,172,101 | B1 | 11/2021 | Boozer et al. |

(Continued)

FOREIGN PATENT DOCUMENTS

| | | | |
|---|---|---|---|
| JP | 5110581 | B2 | 12/2012 |
| KR | 101603710 | B1 | 3/2016 |
| KR | 102071268 | B1 | 1/2020 |

OTHER PUBLICATIONS

Notice of Allowance dated Jun. 30, 2023 for corresponding U.S. Appl. No. 17/584,888.

*Primary Examiner* — Jason R Kurr
(74) *Attorney, Agent, or Firm* — Harness, Dickey & Pierce, P.L.C.

(57) ABSTRACT

An electronic device that includes a first mobile device, and a second mobile device directly connected with the first mobile device through a power line, the second mobile device being configured to perform power line communication with the first mobile device through the power line for a first time period, and perform wireless communication with an external device for a second time period, the second time period not overlapping the first time period.

20 Claims, 17 Drawing Sheets

(56) References Cited

U.S. PATENT DOCUMENTS

| | | | | |
|---|---|---|---|---|
| 11,700,472 | B1 * | 7/2023 | Sjoeroos | H02J 50/402 320/108 |
| 11,818,531 | B2 * | 11/2023 | Bang | H04R 1/1016 |
| 2011/0187321 | A1 | 8/2011 | Hirayama | |
| 2014/0302782 | A1 | 10/2014 | Raab et al. | |
| 2017/0094399 | A1 | 3/2017 | Chandramohan et al. | |
| 2018/0064224 | A1 * | 3/2018 | Brzezinski | A45C 13/02 |
| 2018/0123355 | A1 | 5/2018 | Olson et al. | |

* cited by examiner

10

10

10

MOD2

10a

10b

10c

10d

MOBILE DEVICE, ELECTRONIC DEVICE AND ELECTRONIC SYSTEM FOR POWER LINE COMMUNICATION

CROSS-REFERENCE TO RELATED APPLICATION

This application is a continuation of U.S. application Ser. No. 17/584,888, filed on Jan. 26, 2022, which claims the benefit of priority to Korean Patent Application No. 10-2021-0037771 filed on Mar. 24, 2021 and Korean Patent Application No. 10-2021-0094596 filed on Jul. 20, 2021 in the Korean Intellectual Property Office and all the benefits accruing therefrom under 35 U.S.C. § 119, the contents of each of which in its entirety are herein incorporated by reference.

BACKGROUND

Technical Field

The present disclosure relates to a mobile device, an electronic device, and an electronic system.

Description of the Related Art

Recently, with the development of technologies, communication may be performed between mobile devices. The mobile devices may transmit and receive data in various ways. That is, the mobile devices may perform wire or wireless communication. For example, the mobile devices may perform power line communication (PLC) through a power line. Also, the mobile devices may perform wireless communication without being connected with each other through a terminal.

An ear bud is a device that outputs sound from a source signal that is wirelessly received. The ear bud includes a communication module, such as a Bluetooth module, to perform short-range wireless communication, and includes a battery for supplying a driving power source to the communication module. As a dedicated charging device for charging the battery of the ear bud, a charging case (e.g., cradle) capable of charging the battery of the ear bud together with the storage of the ear bird has been widely used. Power line communication may be performed between the ear bud and the cradle. There is increasing demand for stable data transmission and reception between the ear bud and the cradle.

BRIEF SUMMARY

Embodiments of the present disclosure provide an electronic device that stably transmits and receives data based on power line communication and wireless communication.

Embodiments of the present disclosure provide a mobile device that stably transmits and receives data based on power line communication and wireless communication.

Embodiments of the present disclosure provide an electronic system device that stably transmits and receives data based on power line communication and wireless communication.

Embodiments of the present disclosure are not limited to those mentioned above and embodiments of the present disclosure, which are not mentioned herein, will be clearly understood by those skilled in the art from the following description of the present disclosure.

According to embodiments of the present disclosure, provided is an electronic device that includes a first mobile device, and a second mobile device directly connected with the first mobile device through a power line, the second mobile device being configured to perform power line communication with the first mobile device through the power line for a first time period, and perform wireless communication with an external device for a second time period, the second time period not overlapping the first time period.

According to embodiments of the present disclosure, provided is an electronic device that includes a first mobile device including a first battery, and a second mobile device including a second battery, the second mobile device being directly connected with the first mobile device through a power line, and the second mobile device being configured to provide a first output signal to an external device in a first period, provide a first data signal to the first mobile device after the first output signal is completely provided, provide a second output signal to the external device in a second period, is the second period being subsequent to the first period and longer than the first period, and provide a second data signal to the first mobile device after the second output signal is completely provided.

According to embodiments of the present disclosure, provided is a mobile device that includes a battery, and processing circuitry configured to receive an input signal from an external device, convert the input signal into a rectified voltage, generate an output signal by adjusting the rectified voltage, charge the battery based on the output voltage, generate a pogo voltage on a power line based on the output voltage, perform power line communication through the power line for a first time period, and perform wireless communication with the external device in response to the input signal for a second time period, the first time period not overlapping the second time period.

According to embodiments of the present disclosure, provided is an electronic system that includes an ear bud including a first battery, a cradle directly connected with the ear bud through a power line, the cradle including a second battery used for charging the first battery, and a wireless charging pad adjacent to the cradle and used for charging the second battery, wherein the cradle is configured to provide an ASK signal to the wireless charging pad for a first time period, the ASK signal being generated using a voltage of the second battery, and provide a pogo voltage to the ear bud through the power line for a second time period, the pogo voltage including a data signal generated using the voltage of the second battery, and the first time period not overlapping the second time period.

BRIEF DESCRIPTION OF THE DRAWINGS

Embodiments and features of the present disclosure will become more apparent by describing in detail examples thereof with reference to the attached drawings, in which.

DETAILED DESCRIPTION OF THE DISCLOSURE

Hereinafter, embodiments according to the technical spirits of the present disclosure will be described with reference to the accompanying drawings.

Figure 1:
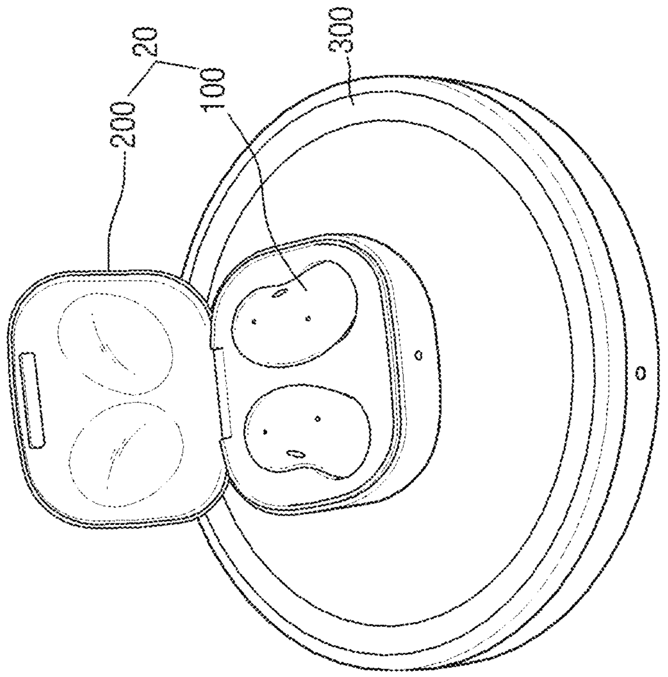
FIG. 1 is a view illustrating an electronic system according to embodiments.

FIG. 1 is a view illustrating an electronic system according to embodiments.

Referring to FIG. 1, an electronic system 10 may include an electronic device 20 and a power transfer device 300. In this case, the electronic device 20 may include a first mobile device 100 and a second mobile device 200. That is, the electronic device 20 may have a shape in which the first mobile device 100 and the second mobile device 200 are coupled with each other. According to embodiments, the electronic device 20 may also be described as a system including the first mobile device 100 coupled the second mobile device 200.

In embodiments, the first mobile device 100 may be a wireless earphone or an ear bud. That is, the first mobile device 100 may be an ear bud that receives an electrical signal from an external electronic device and converts the electrical signal into sound. In this case, the external electronic device and the first mobile device 100 may transmit and receive data to and from each other through wireless communication. The first mobile device 100 may include two ear buds, that is, a pair of ear buds. However, in the present disclosure, it is assumed that the first mobile device 100 has one ear bud, but embodiments of the present disclosure are not limited thereto. The number of first mobile devices 100 is not restricted. The first mobile device 100 may be charged by being accommodated in the second mobile device 200 (e.g., charged by the second mobile device 200 while being accommodated in the second mobile device 200).

In embodiments, the second mobile device 200 may be a charging case or cradle. The second mobile device 200 may charge the first mobile device 100 by accommodating the first mobile device 100 therein. Also, the second mobile device 200 may be charged by a power supplied from the outside (e.g., external to the electronic device 20), and may provide the charged power to the first mobile device 100. The second mobile device 200 and the first mobile device 100 may directly be connected with each other by a wire (e.g., a conductive wire, terminal, etc.), and the first mobile device 100 may be detached from or attached to the second mobile device 200 (e.g., the first mobile device 100 may be detachable from the second mobile device 200). The first mobile device 100 and the second mobile device 200 may transmit and receive data to and from each other through wire communication (may be referred to as wire communication or wired communication herein). The second mobile device 200 may check the state of the first mobile device 100 accommodated therein, through wire communication.

In embodiments, the power transfer device 300 may be a wireless charging pad. The power transfer device 300 may be connected to an external power source to provide power to the second mobile device 200. That is, the power transfer device 300 may convert the external power source into an electrical signal and provide the converted electrical signal to the second mobile device 200. The second mobile device 200 may be charged using the converted electrical signal. When the second mobile device 200 is charged, the second mobile device 200 and the power transfer device 300 may be in contact with each other, but embodiments of the present disclosure are not limited thereto. The second mobile device 200 and the power transfer device 300 may be spaced apart from each other at a predetermined or alternatively, given distance. That is, the second mobile device 200 may be charged when the second mobile device 200 is disposed within a predetermined or alternatively, given distance of the power transfer device 300. Data may be transmitted and received between the second mobile device 200 and the power transfer device 300 through wire communication. Even when the first mobile device 100 is detached from the second mobile device 200, the second mobile device 200 may be charged by the power transfer device 300. Even when the second mobile device 200 accommodates the first mobile device 100, the second mobile device 200 may be charged by the power transfer device 300.

Figure 2:
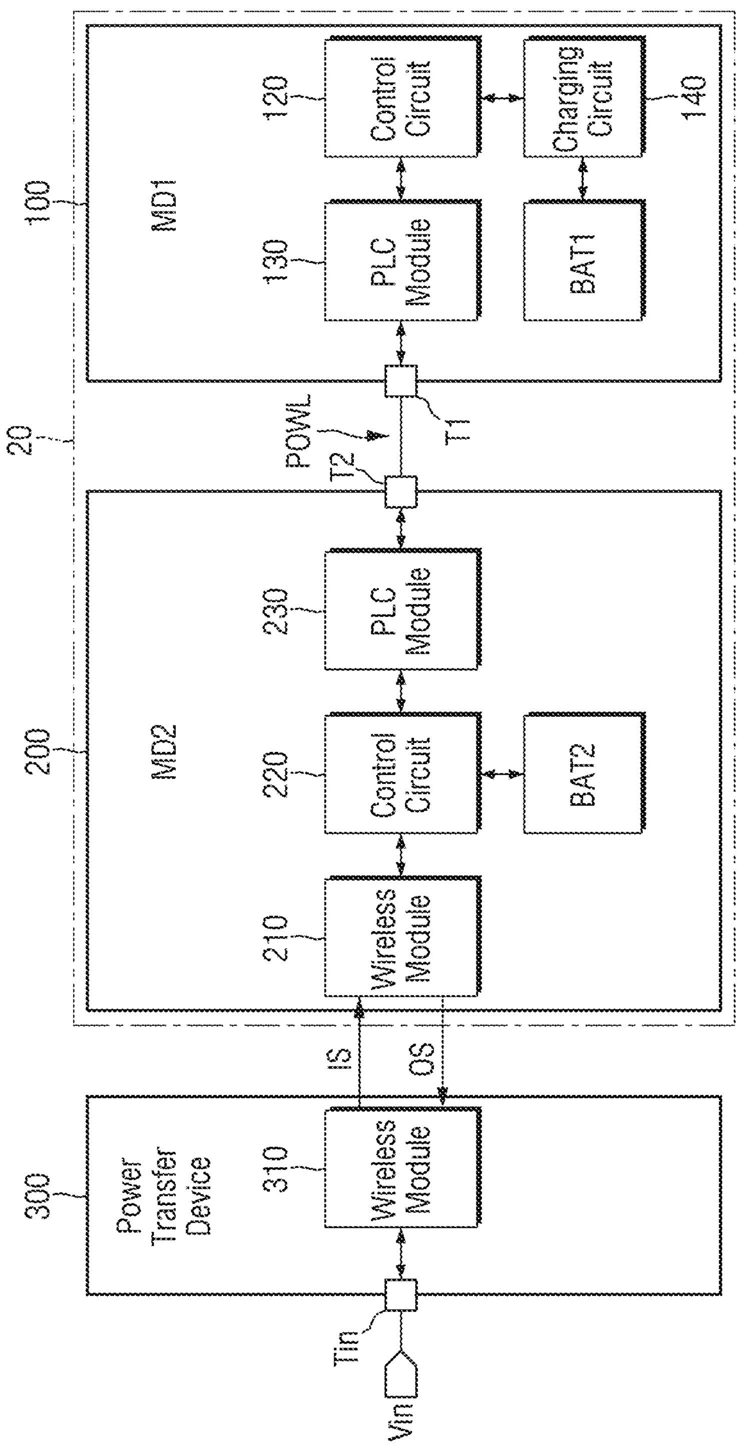
FIG. 2 is a block diagram illustrating the electronic system of FIG. 1.

FIG. 2 is a block diagram illustrating the electronic system of FIG. 1.

Referring to FIG. 2, the electronic device 20 may be disposed to be spaced apart from the power transfer device 300. That is, the electronic device 20 and the power transfer device 300 may not be electrically connected with each other through a terminal, or may not be directly connected with each other. The electronic device 20 and the power transfer device 300 may be in contact with each other, but may not be electrically connected with each other through a metal terminal. On the other hand, the first mobile device 100 and the second mobile device 200 may directly be connected with each other through a power line POWL. That is, the first mobile device 100 and the second mobile device 200 may transmit and receive an electrical signal to and from each other through the power line POWL. The power line POWL may connect a first connection terminal T1 of the first mobile device 100 with a second connection terminal T2 of the second mobile device 200. In this case, the first connection terminal T1 and the second connection terminal T2 may be POGO pins.

In embodiments, the first mobile device 100 may include a control circuit 120, a PLC module 130, a charging circuit 140, and/or a first battery BAT1. The first mobile device 100 may further include an impedance element connected to the first connection terminal T1, wherein the impedance element may include a circuit (e.g., a circuit element) such as a resistor and/or a capacitor. Data may be transmitted and received by a voltage swing or current swing transferred through the power line POWL connected to the first connection terminal T1. Also, a swing level transmitted through the power line POWL may be adjusted in accordance with an impedance value of the impedance element connected to the first connection terminal T1.

The control circuit 120 may control an overall operation of the first mobile device 100. For example, the control circuit 120 may control a communication operation with the second mobile device 200 by controlling the PLC module 130. Also, the control circuit 120 may control the charging circuit 140 to charge the first battery BAT1. In embodiments, the control circuit 120 may include a micro control unit (MCU), but embodiments of the present disclosure are not limited thereto. The control circuit 120 may include a processor or a central processing unit (CPU).

The PLC module 130 may receive the power from the second mobile device 200, and/or may transmit and receive data to and from the second mobile device 200. The PLC module 130 may be controlled by the control circuit 120. For example, the PLC module 130 may modulate an output current signal to output the modulated output current signal through the first connection terminal T1, and/or may demodulate an input voltage signal received through the first connection terminal T1 to transfer the demodulated input voltage signal to the control circuit 120. For example, the PLC module 130 may include a current source, a current modulator, and/or a voltage modulator.

The charging circuit 140 may charge the first battery BAT1 by using the power transferred from the PLC module 130. The charging circuit 140 may charge the first battery BAT1 under the control of the control circuit 120. For example, when the first battery BAT1 is in a discharge state, the charging circuit 140 may charge the first battery BAT1, and when the first battery BAT1 is in a charging completion state, the charging circuit 140 may not charge the first battery BAT1, but embodiments of the present disclosure are not limited thereto.

The first mobile device 100 and the second mobile device 200 may transmit and receive power and data based on power line communication. For example, the first mobile device 100 may receive the power from the second mobile device 200 through the first connection terminal T1, or transmit and receive data to and from the second mobile device 200. For example, the second mobile device 200 may supply the power to the first mobile device 100, or transmit and receive data to and from the first mobile device 100, through the second connection terminal T2.

Power line communication is a communication technique for transmitting power and data between devices through the power line POWL. The power line POWL may be implemented through an electrical contact between the first connection terminal T1 and the second connection terminal T2, whereby power and data may be transmitted. Therefore, the first mobile device 100 may not include other connection terminals other than the first connection terminal T1, and the second mobile device 200 may not include other connection terminals other than the second connection terminal T2. That is, a separate connection terminal and a circuit connected thereto may be removed (or omitted) from the first mobile device 100 and the second mobile device 200, and thus a size of the electronic device 20 may be reduced.

In embodiments, the second mobile device 200 may include a wireless module 210, a control circuit 220, a PLC module 230 and/or a second battery BAT2. The second mobile device 200 may transmit and receive power or data to and from both the first mobile device 100 and the power transfer device 300.

The wireless module 210 may perform wireless communication between the second mobile device 200 and the power transfer device 300. That is, the wireless module 210 may receive an input signal IS from the power transfer device 300, and may provide an output signal OS generated from the second mobile device 200 to the power transfer device 300. In this case, the wireless module 210 may be paired with the wireless module 310 of the power transfer device 300. Also, the wireless module 210 may convert the input signal IS into a specific voltage or a voltage signal, and may convert the specific voltage or the voltage signal into the output signal OS. The wireless module 210 may provide the control circuit 220 with the signal converted from the input signal IS.

The control circuit 220 may control the wireless module 210 and the PLC module 230. For example, the control circuit 220 may convert the voltage converted from the input signal IS by the wireless module 210 into a specific voltage, provide the PLC module 230 with the converted voltage, and may charge the second battery BAT2 by using the corresponding voltage. That is, the control circuit 220 may control the wireless module 210 and the PLC module 230 in connection with power transmission, and data transmission and reception. The control circuit 220 may be implemented to be substantially similar to the control circuit 120 of the first mobile device 100. In embodiments, the control circuit 220 may include an MCU, but embodiments of the present disclosure are not limited thereto. The control circuit 220 may include a processor or a CPU.

The PLC module 230 may transmit and receive data to and from the first mobile device 100. For example, the PLC module 230 may modulate the voltage signal based on the voltage from the control circuit 220 and output the modulated voltage signal through the second connection terminal T2, and/or may demodulate the current signal received through the second connection terminal T2 to transfer the demodulated current signal to the control circuit 220. For example, the PLC module 230 may include a voltage modulator and/or a current modulator. According to embodiments, the second mobile device 200 may relay a message between the first mobile device 100 and the power transfer device 300. For example, the wireless module 210 may receive a message from the power transfer device through the input signal IS, and the PLC module 130 may provide the message to the first mobile device 100. Similarly, the PLC module 130 may receive a message from the first mobile device 100, and the wireless module 210 may provide the message to the power transfer device 300 through the output signal OS.

In other words, the PLC module 130 of the first mobile device 100 and the PLC module 230 of the second mobile device 200 may transmit and receive data to and from each other through the power line POWL, and may transfer the power. That is, power transfer, and data transmission and reception, may be performed through only the power line POWL.

The power transfer device 300 may include an input voltage terminal Tin and a wireless module 310. The input voltage terminal Tin may receive an input voltage Vin from the outside (e.g., a source external to the electronic system 10). The input voltage terminal Tin may receive the input voltage Vin from a power source AC 110 or 220V for home use, or other power supply means (e.g., computer or auxiliary battery). The wireless module 310 may receive and process the input voltage Vin from the outside. For example, the wireless module 310 may generate an input signal IS based on the input voltage Vin, and may provide the input signal IS to the second mobile device 200. In this case, the input signal IS may be a signal for transferring the power, and may include a signal to be transferred to the electronic device 20. Also, the output signal OS received by the wireless module 310 from the electronic device 20 may include a signal to be transferred from the electronic device 20 to the power transfer device 300. That is, the output signal OS may be an acknowledgement signal to the input signal IS, and/or the input signal IS may be an acknowledgement signal to the output signal OS. Communication between the power transfer device 300 and the electronic device 20 may be performed in wireless communication through the wireless module 210 and the wireless module 310.

Figure 3:
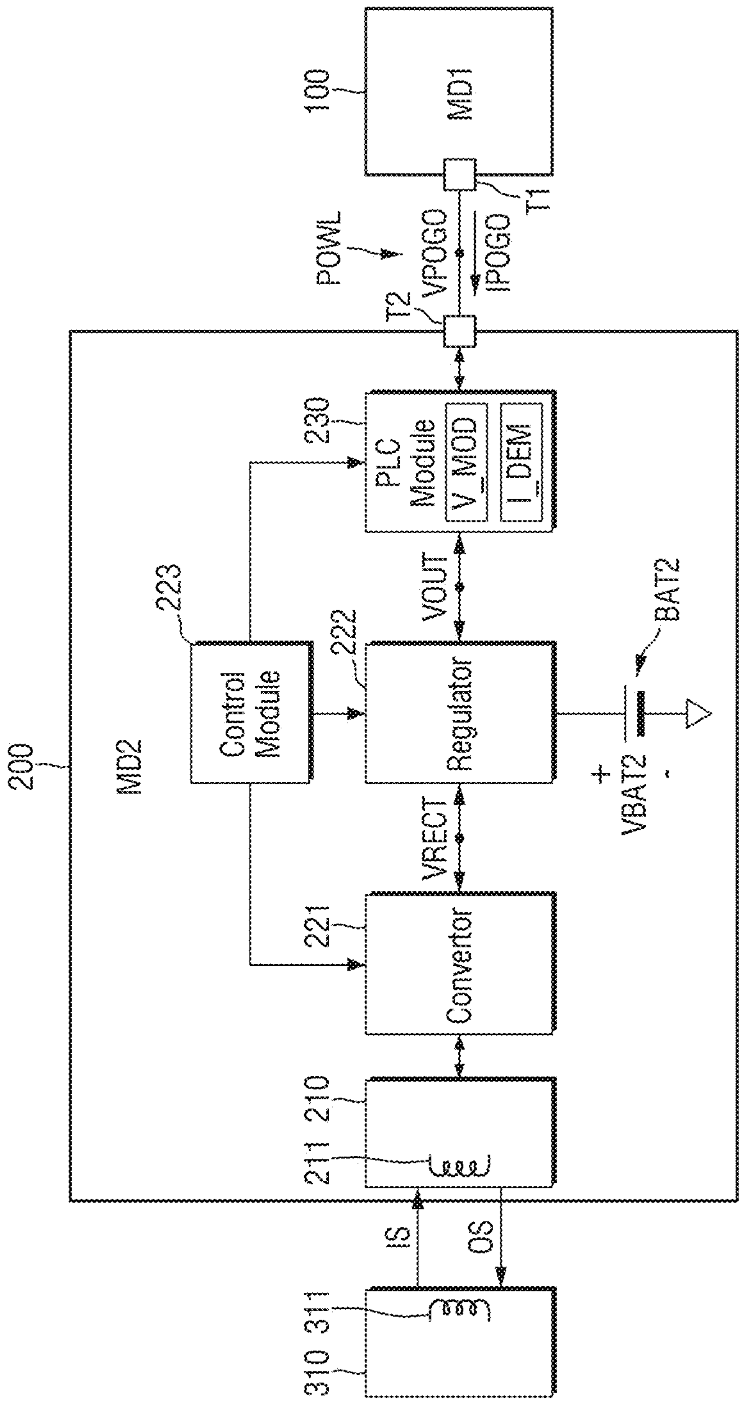
FIG. 3 is a block diagram illustrating an electronic system according to embodiments.
Figure 4:
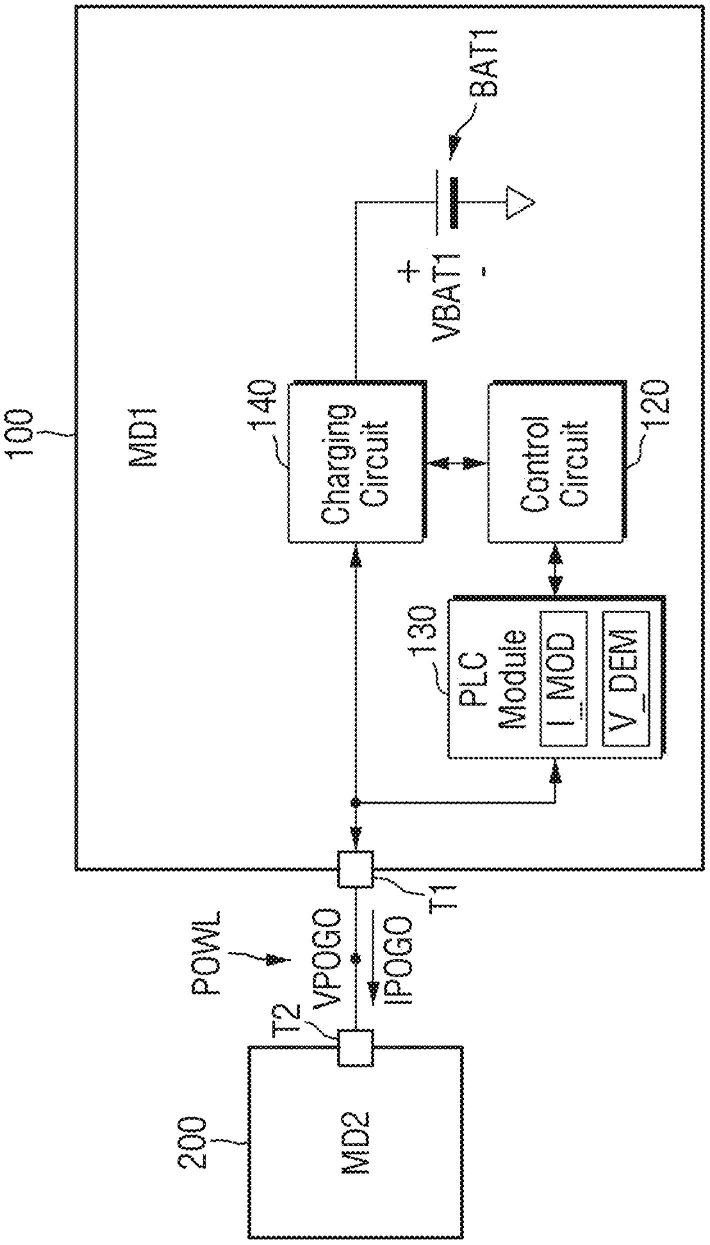
FIG. 4 is a block diagram illustrating an electronic device according to embodiments.
Figure 5:
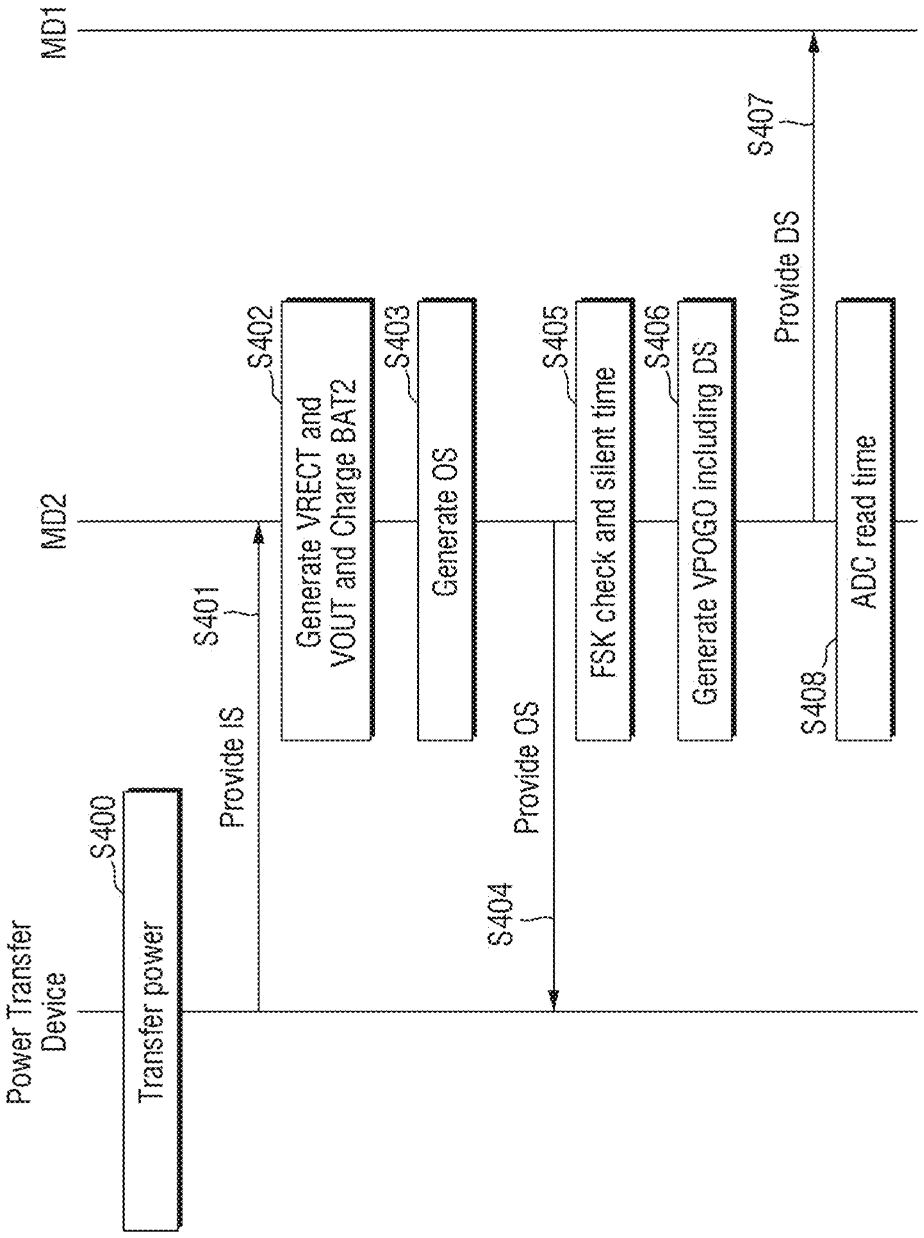
FIG. 5 is a ladder diagram illustrating an operation of an electronic system according to embodiments.

FIG. 3 is a block diagram illustrating an electronic system according to embodiments. FIG. 4 is a block diagram illustrating an electronic device according to embodiments. FIG. 5 is a ladder diagram illustrating an operation of an electronic system according to embodiments.

Referring to FIGS. 3 and 5, the second mobile device 200 may include a converter 221, a regulator 222 and/or a control module 223. In this case, the control circuit 220 described with reference to FIG. 2 may include a converter 221, a regulator 222 and/or a control module 223. The control module 223 may generally control operations of the converter 221, the regulator 222 and the PLC module 230.

The wireless module 310 of the power transfer device 300 may include a coil 311, and the wireless module 210 of the second mobile device 200 may include a coil 211. In this case, the coil 311 and the coil 211 may correspond to each other. That is, the coil 311 and the coil 211 may transmit and receive signals to and from each other by mutual electromagnetic induction.

A voltage or current may be induced to the coil 211 by a change in voltage or current transferred to the coil 311, and an input signal IS may be transferred from the wireless module 310 to the wireless module 210. A voltage or current may be induced to the coil 311 by the change in voltage or current transferred to the coil 211, and an output signal OS may be transferred from the wireless module 210 to the wireless module 310.

For example, the power transfer device 300 may transfer the power (S400). For example, the change in voltage or current may occur in the coil 311 of the wireless module 310. Therefore, the power transfer device 300 may provide the input signal IS to the second mobile device 200 (S401). As the input signal IS is transferred to the second mobile device 200, the wireless module 210 may generate a voltage signal by electromagnetic induction. In this case, the input signal IS may include a frequency shift keying (FSK) signal generated by the power transfer device 300. That is, the input signal IS may include an FSK data packet. Although the input signal IS may be an acknowledgement to the output signal OS received from the second mobile device 200, embodiments of the present disclosure are not limited thereto.

Subsequently, the second mobile device 200 may generate a rectified voltage VRECT and an output voltage VOUT, and may charge the second battery BAT2 (S402). The converter 221 may convert the voltage signal from the wireless module 210 to generate the rectified voltage VRECT. That is, the converter 221 may include a rectifier for rectifying the voltage signal. The converter 221 may include a plurality of transistors and a plurality of passive elements, and may convert the voltage signal induced to the wireless module 210 to output the rectified voltage VRECT. The converter 221 may also be controlled by the control module 223. In this case, the rectified voltage VRECT may include the voltage signal that may include a data signal from the power transfer device 300.

The regulator 222 may generate an output voltage VOUT based on the rectified voltage VRECT output from the converter 221. The regulator 222 may be controlled by the control module 223. The regulator 222 may include a plurality of transistors and a plurality of passive elements, and/or may include an ESD protection circuit. The regulator 222 may charge the second battery BAT2 based on the output voltage VOUT that converts the rectified voltage VRECT. The regulator 222 and the second battery BAT2 may directly be connected with each other. The regulator 222 may adjust a charging method for the second battery BAT2 in accordance with the states of the power transfer device 300 and the first mobile device 100. Therefore, a second battery voltage VBAT2 may be applied to the second battery BAT2. The second battery BAT2 may be charged when a signal is transferred from the power transfer device 300 to the second mobile device 200. In addition, the second battery BAT2 may be discharged as (e.g., while) the first mobile device 100 is connected, and thus the first battery BAT1 may be charged.

The second mobile device 200 may generate an output signal OS (S403). The second mobile device 200 may also provide the output signal OS to the power transfer device 300. For example, the second mobile device 200 may generate the output signal OS by using the second battery voltage VBAT2 of the second battery BAT2. In this case, the output signal OS may include an amplitude shift keying (ASK) signal generated by the second mobile device 200. That is, the output signal OS may include an ASK data packet. The output signal OS may be an acknowledgement to the input signal IS received from the power transfer device 300, but embodiments of the present disclosure are not limited thereto. In summary, the second mobile device 200 may be charged by the power transfer device 300, and at the same time or contemporaneously, transmit and receive the input signal IS and the output signal OS to and from the power transfer device 300. That is, the power transfer device 300 and the second mobile device 200 may transmit and receive the ASK signal and the FSK signal to and from each other.

The PLC module 230 may include a voltage modulator V_MOD and a current demodulator I_DEM. For example, the PLC module 230 may be driven based on the output voltage VOUT. The PLC module 230 may be controlled by the control module 223. The PLC module 230 may control a pogo voltage VPOGO and a pogo current IPOGO applied to the power line POWL. For example, the voltage modulator V_MOD may generate a pogo voltage VPOGO and provide the generated pogo voltage VPOGO to the power line POWL, and the current demodulator I_DEM may receive data by demodulating the pogo current IPOGO. The generated pogo voltage VPOGO may include a data signal. In addition, the first mobile device 100 may be charged by the pogo voltage VPOGO transferred to the power line POWL.

Referring to FIG. 4, the PLC module 130 of the first mobile device 100 may include a current modulator I_MOD and/or a voltage demodulator V_DEM. The current modulator I_MOD may generate a pogo current IPOGO to provide the pogo current IPOGO to the power line POWL, and/or the voltage demodulator V_DEM may receive data by demodulating the pogo voltage VPOGO.

The control circuit 120 may drive the charging circuit 140 by processing the data of the demodulated pogo voltage VPOGO. Also, the charging circuit 140 may charge the first battery BAT1 under the control of the control circuit 120. That is, the charging circuit 140 may charge the first battery BAT1 based on the pogo voltage VPOGO. The first battery BAT1 may be charged with the first battery voltage VBAT1.

The first mobile device 100 may be charged by the pogo voltage VPOGO transferred by the power line POWL, and may receive data included in the pogo voltage VPOGO that includes a voltage swing. Further, the first mobile device 100 may provide the pogo current IPOGO, which includes a current swing, to the second mobile device 200 through the power line POWL, thereby providing data included in the pogo current IPOGO. That is, the first mobile device 100 and the second mobile device 200 may perform wire charging through the power line POWL, and at the same time or contemporaneously, perform power line communication.

Referring back to FIGS. 3 and 5, the second mobile device 200 may perform FSK check and silent time (S405). That is, the second mobile device 200 may perform FSK check after transmitting the ASK signal to the power transfer device 300. The second mobile device 200 may check that the FSK signal is transferred from the power transfer device 300 in response to the ASK signal, but embodiments of the present disclosure are not limited thereto, and the FSK check operation may be omitted. According to embodiments, operation S405 may include pausing transmission of ASK signals to the power transfer device 300 and monitoring for a FSK signal from the power transfer device 300.

Subsequently, the second mobile device 200 may generate a pogo voltage VPOGO that includes a data signal DS (S406). For example, the voltage modulator V_MOD of the PLC module 230 may generate a pogo voltage VPOGO based on the output voltage VOUT. The data signal DS may correspond to a swing of the generated pogo voltage VPOGO. That is, the generating operation of the pogo voltage VPOGO including the data signal DS may be performed after the ASK signal is transmitted.

Subsequently, the second mobile device 200 may provide the data signal DS to the first mobile device 100 (S407). The transfer operation of the pogo voltage VPOGO including the data signal DS may be performed after the ASK signal is transmitted. That is, a time period at which the pogo voltage VPOGO including the data signal DS is transferred may not overlap a time period at which the ASK signal is transferred. For example, the timing for wireless communication between the second mobile device 200 and the power transfer device 300 may not overlap the timing for wire communication between the second mobile device 200 and the first mobile device 100.

Subsequently, the second mobile device 200 may perform ADC read time (S408). That is, after applying the pogo voltage VPOGO including the data signal DS to the power line POWL, the second mobile device 200 may perform the ADC read time. According to embodiments, operation S408 may include monitoring the terminal T2 for an analog signal from the first mobile device 100 (e.g., the pogo current IPOGO) and converting the analog signal to a digital signal using, e.g., an analog to digital converter ADC.

In short, the second mobile device 200 may perform wireless communication and wire communication at different times. For example, the time when the output signal OS including the ASK signal is transferred from the second mobile device 200 to the power transfer device 300 may correspond to a wireless communication time period, and the time when the pogo voltage VPOGO including the data signal DS is transferred from the second mobile device 200 to the first mobile device 100 may correspond to a wire communication time period. The wireless communication time period and the wire communication time period, which are performed by the second mobile device 200, may not overlap each other, and thus noise generated by wireless communication may not affect (or may have a reduced effect on) wire communication. That is, different types of communication operations may be performed at different time periods, whereby occurrence of the noise may be reduced. Therefore, the second mobile device 200 may be provided to stably transmit and receive data based on power line communication and wireless communication.

Figure 6:
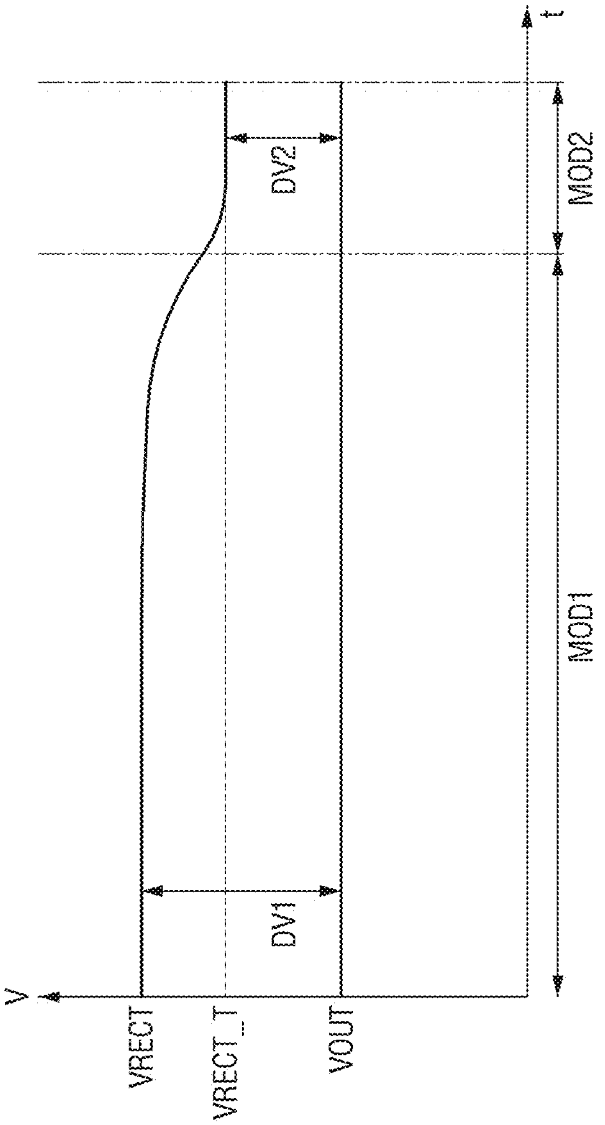
FIG. 6 is a graph illustrating a type of a voltage based on time according to embodiments.
Figure 7:
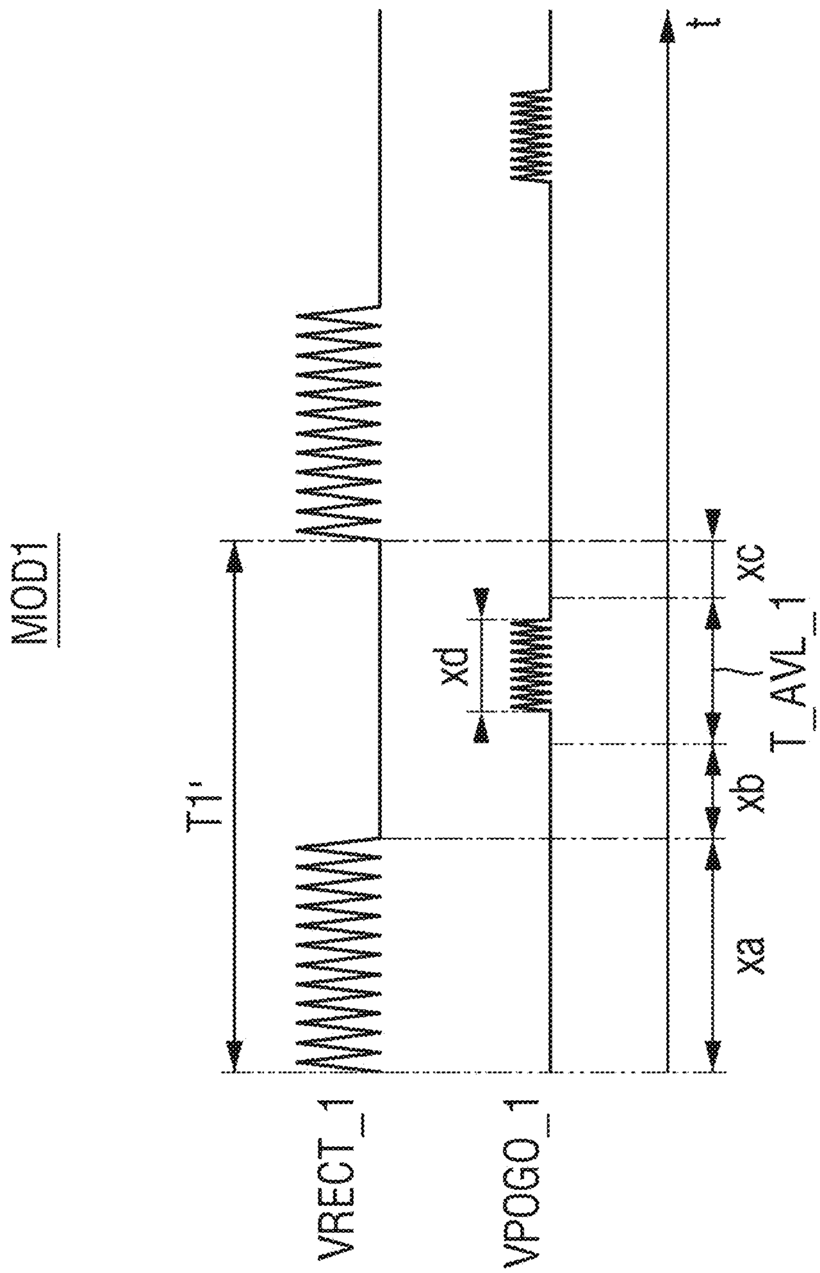
FIG. 7 is a graph illustrating a type of a voltage in a first mode of FIG. 6.
Figure 8:
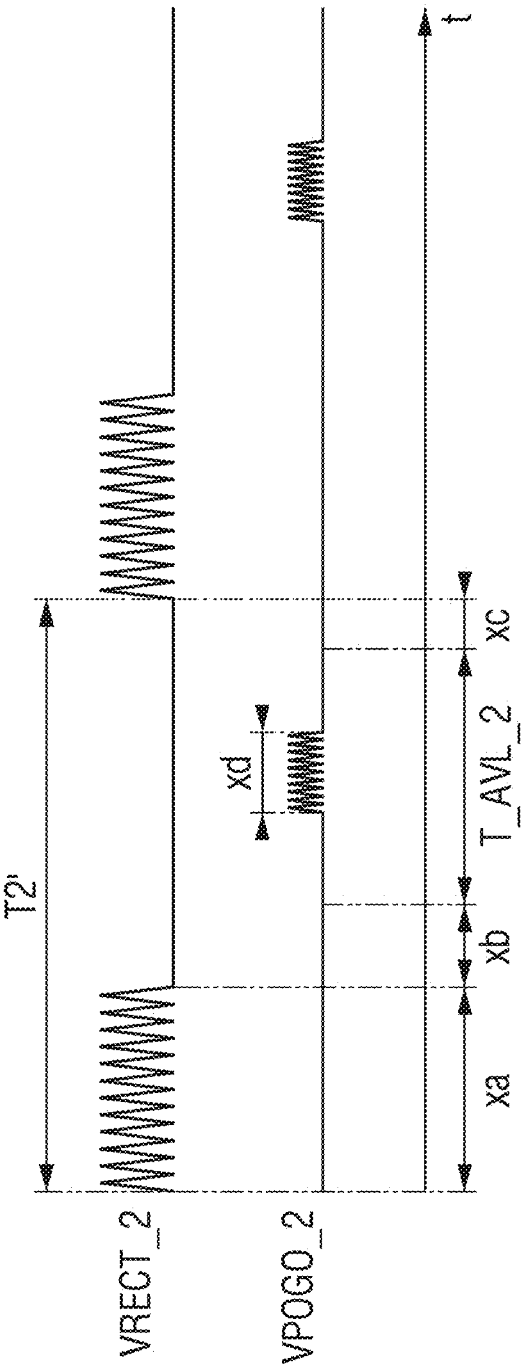
FIG. 8 is a graph illustrating a type of a voltage in a second mode of FIG. 6.

FIG. 6 is a graph illustrating a type of a voltage based on time according to embodiments. FIG. 7 is a graph illustrating a type of a voltage in a first mode of FIG. 6. FIG. 8 is a graph illustrating a type of a voltage in a second mode of FIG. 6.

Referring to FIGS. 3 and 6, the second mobile device 200 may operate in a first mode MOD1 and/or a second mode MOD2. In this case, the first mode MOD1 may correspond to a time period at which a signal starts to be transferred (e.g., signal transfer is initiated) from the power transfer device 300 to the second mobile device 200, and the second mode MOD2 may correspond to a time period after a signal is sufficiently transferred from the power transfer device 300 to the second mobile device 200. That is, the second mode MOD2 may correspond to a time period at which the second mobile device 200 and the power transfer device 300 are stabilized.

In the first mode MOD1, the converter 221 of the second mobile device 200 may generate a rectified voltage VRECT, and the regulator 222 may generate an output voltage VOUT. That is, the rectified voltage VRECT is generated by the voltage induced by the power transfer device 300, and the output voltage VOUT is generated based on the rectified voltage VRECT. For example, in the first mode MOD1, the rectified voltage VRECT may be about 7V, and the output voltage VOUT may be about 5V. A voltage difference between the rectified voltage VRECT and the output voltage VOUT may be a first voltage difference DV1. At the early stage of the first mode MOD1, the rectified voltage VRECT may be greater than the output voltage VOUT. As time passes, the rectified voltage VRECT may vary to be close to a target rectified voltage VRECT_T. That is, as time passes, the first voltage difference DV1 may be reduced. The first voltage difference DV1 may be referred to as a headroom.

In the second mode MOD2, the converter 221 may generate a rectified voltage VRECT, and the regulator 222 may generate an output voltage VOUT. For example, in the second mode MOD2, the rectified voltage VRECT may be about 6V, and the output voltage VOUT may be about 5V. That is, the rectified voltage VRECT in the second mode MOD2 may reach a target rectified voltage VRECT_T. A voltage difference between the rectified voltage VRECT and the output voltage VOUT may be a second voltage difference DV2. The second voltage difference DV2 in the second mode MOD2 may be smaller than the first voltage difference DV1. Therefore, the headroom between the rectified voltage VRECT and the output voltage VOUT may be reduced. As the headroom between the rectified voltage VRECT and the output voltage VOUT is reduced, the ASK signal may be induced to the power line, and noise may occur due to an overlap between the ASK signal and the pogo voltage VPOGO.

According to embodiments of the present disclosure, as a wireless communication operation and a power line communication operation are performed during different time periods, noise caused by the second mobile device 200 may not occur even though the headroom between the rectified voltage VRECT and the output voltage VOUT is reduced.

Referring to FIGS. 6 and 7, in the first mode MOD1, a first rectified voltage VRECT_1 may have a first ASK signal generation period T1'. That is, a first ASK signal included in the first rectified voltage VRECT_1 may be generated every first ASK signal generation period T1'. The first ASK signal may be expressed as a swing of the first rectified voltage VRECT_1. In this case, the first ASK signal may have an ASK packet length xa. That is, the first ASK signal included in the first rectified voltage VRECT_1 may be provided from the second mobile device 200 to the power transfer device 300 for a time period corresponding to the ASK packet length xa.

After the first ASK signal included in the first rectified voltage VRECT_1 is transferred, an FSK check time xb may proceed and then a first data signal included in a first pogo voltage VPOGO_1 may be transferred. In this case, the first data signal may be transferred during a first PLC available time T_AVL_1. That is, the first data signal may be transferred from the second mobile device 200 to the first mobile device 100 through the power line POWL during the first PLC available time T_AVL_1. In this case, the data packet length xd of the first data signal may be smaller than the first PLC available time T_AVL_1. In addition, ADC read time xc may be performed after the first PLC available time T_AVL_1.

In embodiments, the ASK packet length xa (and/or transmission of the ASK packet) may correspond to the operation S404 of FIG. 5, the FSK check time xb may correspond to the operation S405 of FIG. 5, the data packet length xd (and/or transmission of the data packet) may correspond to the operation S407 of FIG. 5, and the ADC read time xc may correspond to the operation S408 of FIG. 5, but embodiments of the present disclosure are not limited thereto.

That is, in the first mode MOD1, a plurality of operations may be performed during the first ASK signal generation period T1. In this case, the ASK packet length xa corresponding to the time when the ASK signal is transferred through wireless communication and the first PLC available time T_AVL_1 or the data packet length xd may not overlap each other. As the wireless communication operation and the power line communication operation by the second mobile device 200 are performed at different times, noise may be reduced.

In addition, the first ASK signal generation period T1' may be a sum of the ASK packet length xa, the FSK check time xb, the first PLC available time T_AVL_1 and the ADC read time xc. The second mobile device 200 may calculate the first PLC available time T_AVL_1 which does not overlap the ASK packet length xa within the first ASK signal generation period T1', and may transmit the data signal during the corresponding time. Afterwards, the operation of the second mobile device 200 may be repeated for the first mode MOD1 in accordance with the first ASK signal generation period T1'.

Referring to FIGS. 6 and 8, in the second mode MOD2, the second rectified voltage VRECT_2 may have a second ASK signal generation period T2'. That is, a second ASK signal included in the second rectified voltage VRECT_2 may be generated every second ASK signal generation period T2'. In this case, the second ASK signal generation period T2' may be larger than the first ASK signal generation period T1'. That is, as time passes, the second mobile device 200 may perform the second mode MOD2 from the first mode MOD1, and the ASK signal generation period may also be increased. For example, the first ASK signal generation period T1' may be 80 ms, and the second ASK signal generation period T2' may be 128 ms.

In embodiments, an ASK packet length xa, an FSK check time xb, a data packet length xd and an ADC read time xc of FIG. 8 may be equal to those corresponding to FIG. 7. As the ASK signal generation period is increased from the first ASK signal generation period T1' to the second ASK signal generation period T2', the second PLC available time T_AVL_2 may also be increased. That is, the second PLC available time T_AVL_2 may be larger than the first PLC available time T_AVL_1 in the first mode MOD1.

As the second ASK signal generation period T2' is increased in the second mode MOD2, the time when (e.g., the period of time during which) the data packet is transmitted may be increased. That is, the second PLC available time T_AVL_2 calculated by the second mobile device 200 may be increased, and the data packet may be transmitted within the second PLC available time T_AVL_2.

Figure 9:
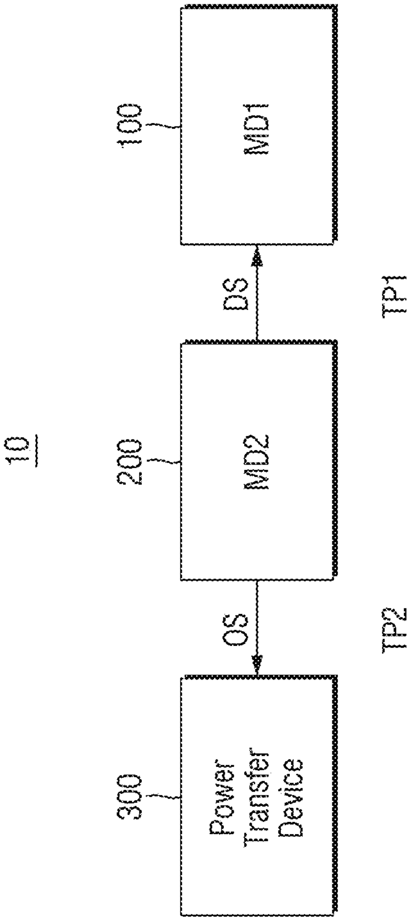
FIG. 9 is a block diagram illustrating a signal transfer of an electronic system according to embodiments.

FIG. 9 is a block diagram illustrating a signal transfer of an electronic system according to embodiments.

Referring to FIG. 9, the second mobile device 200 of the electronic system 10 may perform a wireless communication operation and a power line communication operation at different times. For example, the second mobile device 200 may provide the data signal DS to the first mobile device 100 for a first time period TP1, and may provide the output signal OS to the power transfer device 300 for a second time period TP2. In this case, the first time period TP1 may correspond to the first PLC available time T_AVL_1 or the second PLC available time T_AVL_2, which is described with reference to FIG. 7, and the second time period TP2 may correspond to the ASK packet length xa. The first time period TP1 and the second time period TP2 are not overlapped with each other, and thus noise of the electronic system 10 that includes the second mobile device 200 may be more reduced.

Although the communication operation between the second mobile device 200 and the first mobile device 100 and the communication operation between the second mobile device 200 and the power transfer device 300 are described as being performed at different times, the charging operation of the second mobile device 200 and the first mobile device 100 may be performed at the same time (or contemporaneously). That is, only the swing of the voltage or current transferred to each mobile device may be performed at another (e.g., different) time period.

Figure 10:
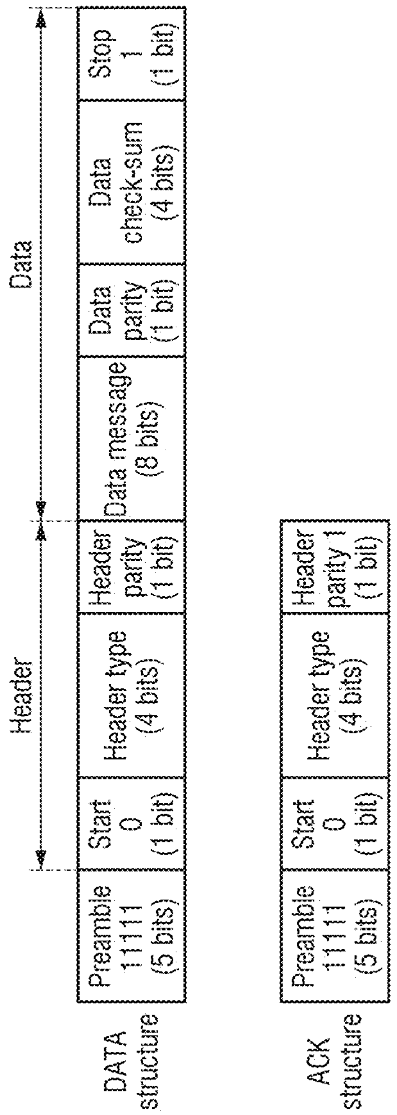
FIG. 10 is a diagram illustrating structures of a data signal and an acknowledgement signal ACK, which are transmitted and received between mobile devices.

FIG. 10 is a diagram illustrating structures of a data signal and an acknowledgement signal ACK, which are transmitted and received between mobile devices.

Referring to FIG. 10, the data signal DS may be transmitted and received based on a voltage swing or a current swing through the power line POWL from the second mobile device 200. The data signal DS may include a plurality of fields. For example, the data signal DS may include a start field, a header type field, a header parity field, a data message field, a data parity field, a data checksum field, and/or a stop field. The data signal DS may include a preamble signal transmitted before data having a predetermined or alternatively given structure is transmitted.

The start field, the header type field and the header parity field may correspond to header information, and the data message field, the data parity field, the data checksum field and the stop field may correspond to data information. For example, the start field may have a value of 1 bit, and may correspond to information indicating the start of data transmission. The header type field may include a plurality of bits, and may indicate a type of data to be transmitted. The header parity field may have a value of 1 bit, and may be intended or used to determine the validity of the header information that is transmitted.

The data message field also includes actual data having a plurality of bits. The data parity field may have a value of 1 bit, and may be intended or used to determine the validity of data. The data checksum field may include a plurality of bits for error detection of data, and the stop field may have a value of 1 bit to indicate the end of data transmission.

The first mobile device 100 may provide the second mobile device 200 with an acknowledgement signal ACK for enhancing reliability of data transmission and reception. That is, the first mobile device 100 may provide the acknowledgement signal ACK to the second mobile device 200 in response to the data signal DS. The acknowledgement signal ACK may have a field structure that is shorter than the data signal DS. The acknowledgement signal ACK may include a start field, a header type field and/or a header parity field. Also, the acknowledgement signal ACK may include a preamble signal.

The start field may have a value of 1 bit, and may correspond to information indicating the start of the transmission of the acknowledgement signal ACK. The header type field may include a plurality of bits and indicate a type of the acknowledgement signal ACK that is transmitted. The header parity field may include 1 bit, and may be intended or used to determine the validity of the header information that is transmitted.

In transmission and reception of the data signal DS and the acknowledgement signal ACK, a case that there is a toggle within one period may correspond to logic “1”, and a case that there is no toggle may correspond to logic “0”.

Hereinafter, an operation method of the electronic system 10 according to embodiments will be described with reference to FIG. 11.

Figure 11:
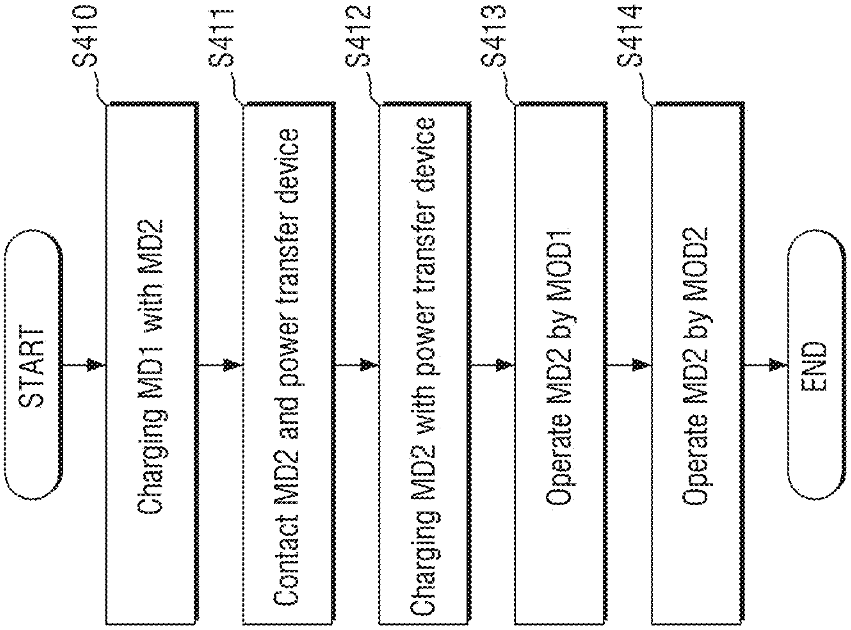
FIG. 11 is a flow chart illustrating an operation method of an electronic system according to embodiments.

FIG. 11 is a flow chart illustrating an operation method of an electronic system according to embodiments. For convenience of description, a portion duplicated with that described with reference to FIGS. 1 to 10 will be briefly described or omitted.

Referring to FIG. 11, the electronic system 10 may charge the first mobile device 100 by using the second mobile device 200 (S410). That is, the electronic device 20 of the electronic system 10 may have a state that the first mobile device 100 is accommodated in the second mobile device 200. The first mobile device 100 may directly be connected with the second mobile device 200 through the power line POWL. At this time, the second battery BAT2 of the second mobile device 200 may be discharged as time passes, and the first battery BAT1 of the first mobile device 100 may be charged as time passes. At this time, power line communication between the first mobile device 100 and the second mobile device 200 may be performed.

Subsequently, the second mobile device 200 and the power transfer device 300 may be in contact with each other (S411). For example, the electronic device 20 may be in contact with the power transfer device 300, but embodiments of the present disclosure are not limited thereto. The electronic device 20 may be disposed to be spaced apart from the power transfer device 300 at a predetermined or alternatively, given distance.

The electronic system 10 may charge the second mobile device 200 by using the power transfer device 300 (S412). The second battery BAT2 of the second mobile device 200 may be charged due to the electromagnetic induction between the power transfer device 300 and the second mobile device 200. That is, the second battery BAT2 and the first battery BAT1 may be charged at the same time or contemporaneously.

After the second mobile device 200 starts to be charged by the power transfer device 300, the second mobile device 200 may operate in the first mode MOD1 (S413). Referring to FIGS. 6 and 7, the second mobile device 200 may output a first rectified voltage VRECT_1 having a first ASK signal generation period T1' in the first mode MOD1. Further, the data packet using power line communication may be transferred during the first PLC available time T_AVL_1.

Subsequently, after the first mode MOD1, the second mobile device 200 may operate in the second mode MOD2 (S414). Referring to FIGS. 6 and 8, the second mobile device 200 may output a second rectified voltage VRECT_2 having a second ASK signal generation period T2' in the second mode MOD2. In addition, the data packet using power line communication may be transferred during the second PLC available time T_AVL_2.

That is, even in the case that the electronic device 20, which includes the first mobile device 100 being charged by the second mobile device 200, is charged by the power transfer device 300, wireless communication and power line communication may respectively be performed at time periods that are not overlapped with each other.

An operation method of the electronic system 10 according to embodiments will be described with reference to FIG. 12.

Figure 12:
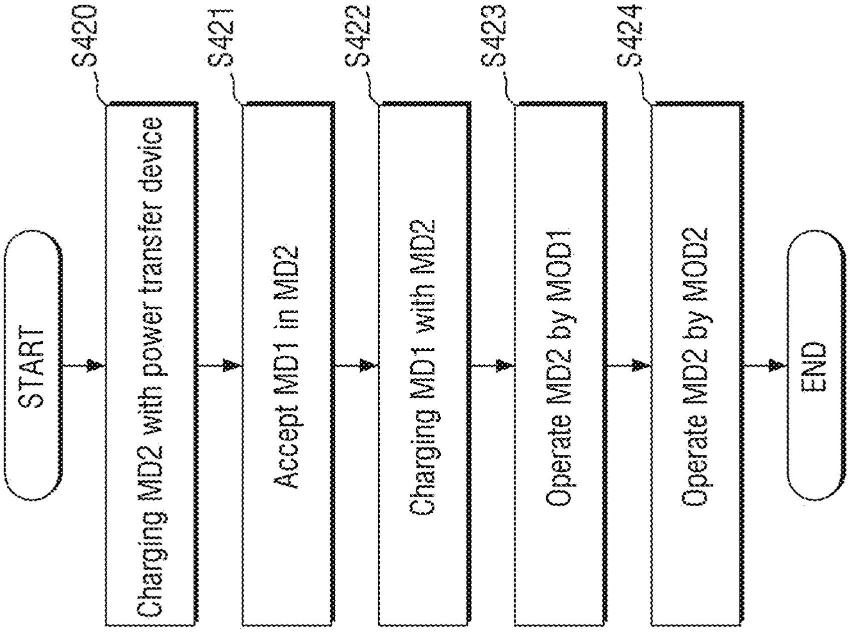
FIG. 12 is a flow chart illustrating an operation method of an electronic system according to embodiments.

FIG. 12 is a flow chart illustrating an operation method of an electronic system according to embodiments. For convenience of description, a portion duplicated with that described with reference to FIGS. 1 to 11 will be briefly described or omitted.

Referring to FIG. 12, the electronic system 10 may charge the second mobile device 200 by using the power transfer device 300 (S420). That is, before the first mobile device 100 is connected to the second mobile device 200, the second mobile device 200 may wirelessly be charged by the power transfer device 300. The second battery BAT2 of the second mobile device 200 may be in the middle of (e.g., in the process of) being charged.

Subsequently, the first mobile device 100 may be accommodated in the second mobile device 200 (S421). The first mobile device 100 may also be charged using the second mobile device 200 (S422). The second mobile device 200 may directly be connected with the first mobile device 100 through the power line POWL, and may perform power line communication. That is, the first battery BAT1 of the first mobile device 100 may be charged using the second battery BAT2 of the second mobile device 200. In addition, wireless communication between the second mobile device 200 and the power transfer device 300 may be performed at a time period different from that of power line communication between the second mobile device 200 and the first mobile device 100.

Subsequently, the second mobile device 200 may operate in the first mode MOD1 (S423). Subsequently, after the first mode MOD1, the second mobile device 200 may operate in the second mode MOD2 (S424).

Hereinafter, an electronic system 10*a* according to embodiments will be described with reference to FIG. 13.

Figure 13:
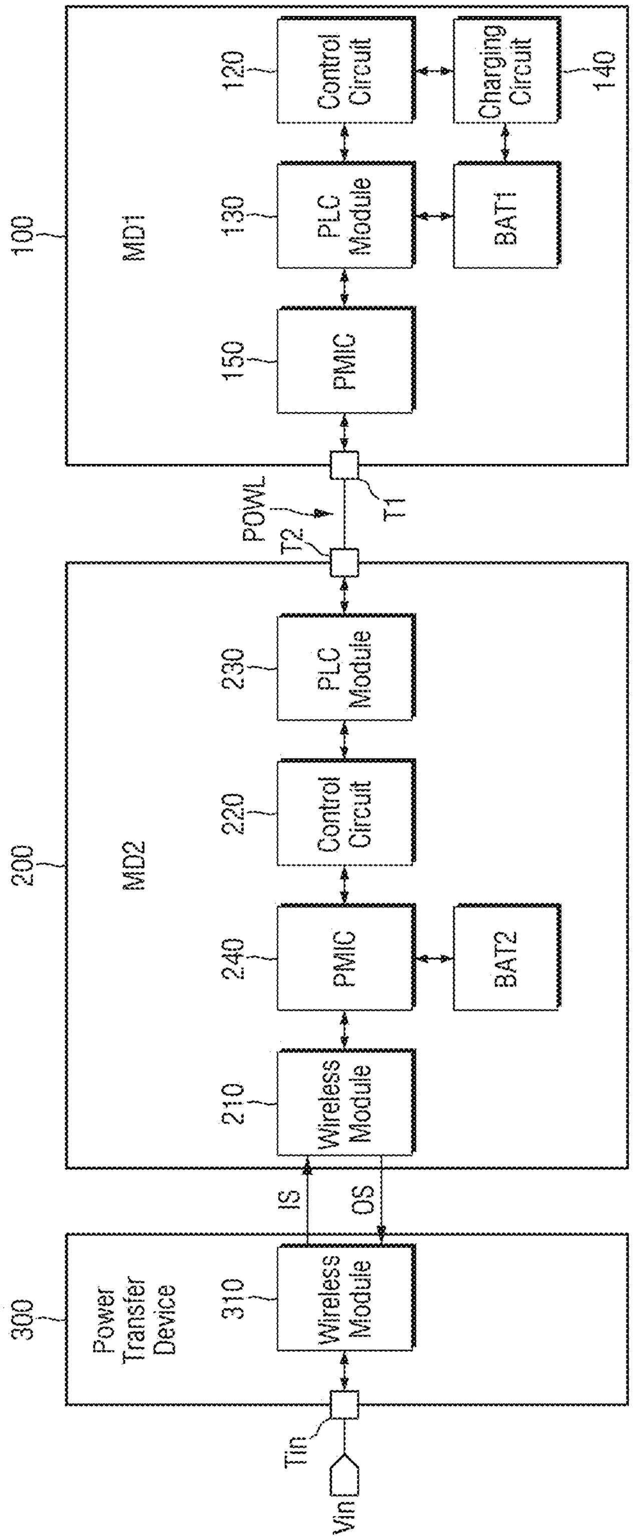
FIG. 13 is a block diagram illustrating an electronic system according to embodiments.

FIG. 13 is a block diagram illustrating an electronic system according to embodiments. For convenience of description, a portion duplicated with that described with reference to FIGS. 1 to 12 will be briefly described or omitted.

Referring to FIG. 13, the first mobile device 100 of the electronic system 10*a* may include a power management integrated circuit 150, and the second mobile device 200 may include a power management integrated circuit 240. The power management integrated circuit 150 may manage the first battery BAT1, and the power management integrated circuit 240 may manage the second battery BAT2. Further, the power management integrated circuit 150 and the power management integrated circuit 240 may control the current or voltage used for power line communication based on the power line POWL. For example, the PLC module 130 may perform current modulation or voltage demodulations by using the power from the power management integrated circuit 150, and the PLC module 230 may perform voltage modulation or current demodulations by using the power from the power management integrated circuit 240.

The power management integrated circuit 150 may control a mode in which the first battery BAT1 is charged, in accordance with connection with the second mobile device 200, and the power management integrated circuit 240 may control a mode in which the second battery BAT2 is charged, in accordance with connection with the first mobile device 100 and/or the power transfer device 300.

Hereinafter, an electronic system 10*b* according to embodiments will be described with reference to FIG. 14.

Figure 14:
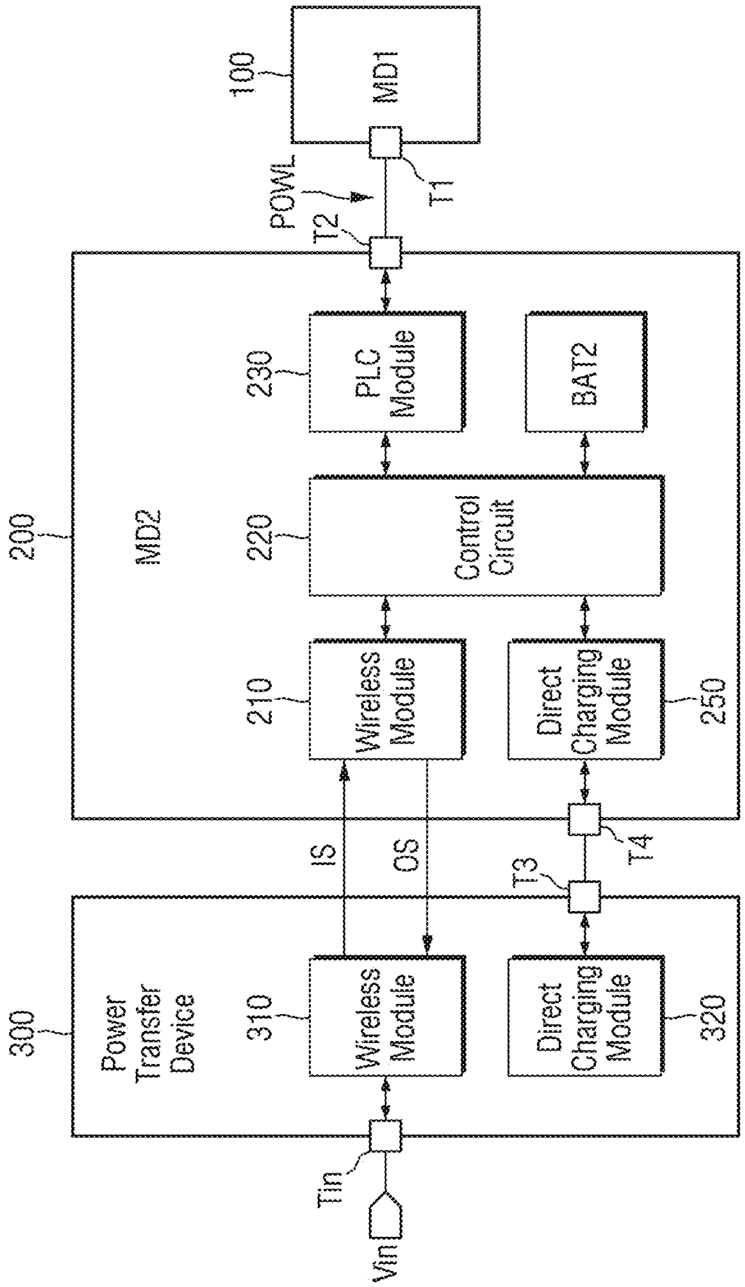
FIG. 14 is a block diagram illustrating an electronic system according to embodiments.
Figure 15:
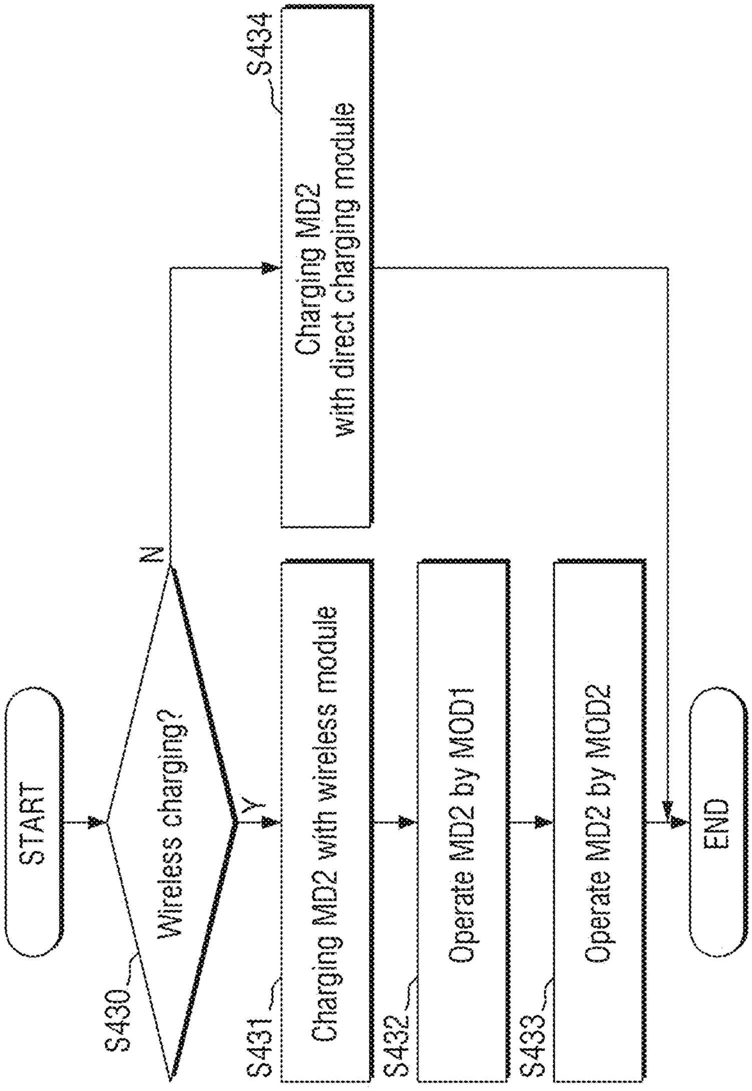
FIG. 15 is a flow chart illustrating an operation of the electronic system of FIG. 14.

FIG. 14 is a block diagram illustrating an electronic system according to embodiments. FIG. 15 is a flow chart illustrating an operation of the electronic system of FIG. 14. For convenience of description, a portion duplicated with that described with reference to FIGS. 1 to 13 will be briefly described or omitted.

Referring to FIG. 14, the electronic system 10*b* may support both wireless charging and wire charging between the second mobile device 200 and the power transfer device 300.

For example, the second mobile device 200 may include a wireless module 210, and the power transfer device 300 may include a wireless module 310, and wireless charging of the second battery BAT2 may be performed by signal transfer between the wireless module 210 and the wireless module 310.

Simultaneously or contemporaneously, the second mobile device 200 may perform wire charging by the power transfer device 300. For example, the second mobile device 200 may include a direct charging module 250, and the power transfer device 300 may include a direct charging module 320. In this case, the direct charging module 250 and the direct charging module 320 may directly be connected with each other through a third connection terminal T3 and a fourth connection terminal T4. That is, the second mobile device 200 may receive the power from the power transfer device 300 in a wired manner, and may charge the second battery BAT2 based on the received power. In addition, the second mobile device 200 may perform wire communication with the power transfer device 300. That is, the second mobile device 200 described with reference to FIGS. 1 to 13 performs wireless charging by the power transfer device 300 and performs wireless communication with the power transfer device 300, whereas the second mobile device 200 described with reference to FIG. 14 may perform wire charging and wire communication as well as wireless charging and wireless communication.

Referring to FIG. 15, it may be determined whether the second mobile device 200 corresponds to wireless charging (S430). When it is determined that the second mobile device 200 corresponds to wireless charging (S430-Y), for example, when the power transfer device 300 and the second mobile device 200 are not electrically connected with each other (e.g., not directly be connected with each other through the third connection terminal T3 and the fourth connection terminal T4), the second mobile device 200 may be charged using the wireless module 210 (S431). Afterwards, the second mobile device 200 may operate in the first mode MOD1 (S432) and then operate in the second mode MOD2 (S433).

When it is not determined that the second mobile device 200 corresponds to wireless charging (S430-N), for example, when the power transfer device 300 and the second mobile device 200 are electrically and directly connected with each other, the second mobile device 200 may be charged using the direct charging module 250 (S434). That is, the second mobile device 200 may directly receive a voltage and/or current from the power transfer device 300, and may charge the second battery BAT2 by using the voltage and/or current.

At this time, the second mobile device 200 may perform wire charging by the power transfer device 300, and at the same time (or contemporaneously) may perform wire charging with respect to the first mobile device 100. Also, the second mobile device 200 may perform wire communication with the power transfer device 300, and may perform power line communication with the first mobile device 100. In this case, the time when wire communication between the second mobile device 200 and the power transfer device 300 is performed may overlap the time when power line communication between the second mobile device 200 and the first mobile device 100 is performed. That is, the second mobile device 200 may simultaneously (or contemporaneously) perform communication with the power transfer device 300 and the first mobile device 100, which may not generate noise or may generate less noise (e.g., due to the connection between the second mobile device 200 and the power transfer device 300 being wired instead of wireless).

However, when the second mobile device 200 performs wireless communication with the power transfer device 300, the time period for performing wireless communication may not overlap the time period at which the second mobile device 200 performs power line communication with the first mobile device 100.

Hereinafter, an electronic system 10*c* according to embodiments will be described with reference to FIG. 16.

Figure 16:
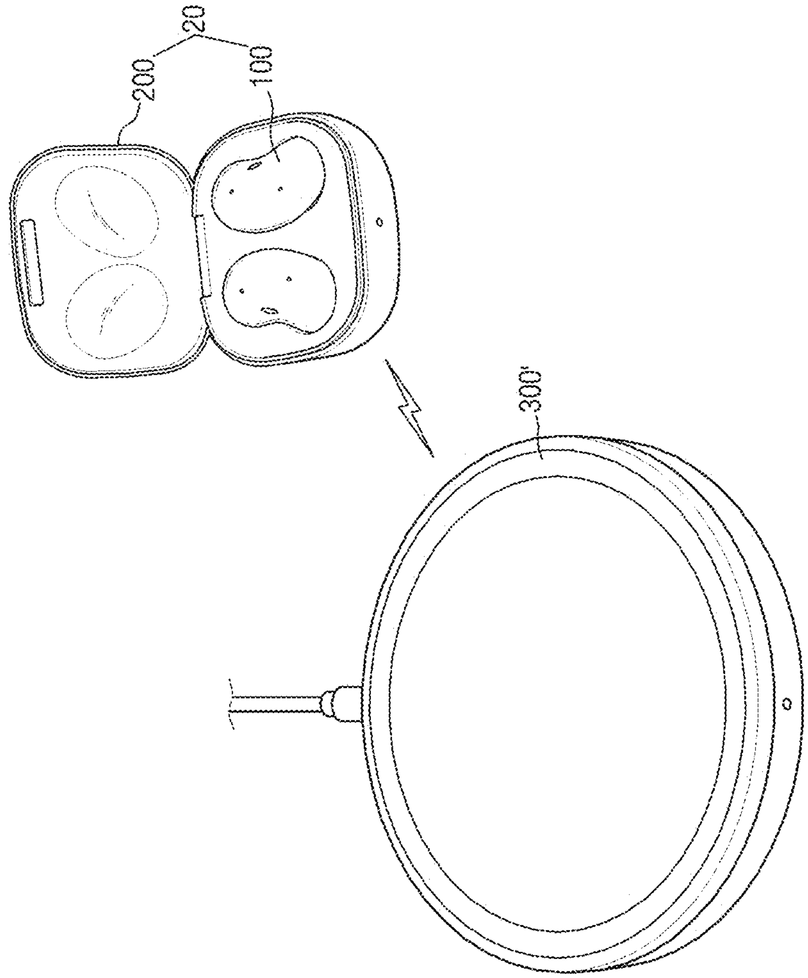
FIG. 16 is a diagram illustrating an electronic system according to embodiments.

FIG. 16 is a diagram illustrating an electronic system according to embodiments. For convenience of description, a portion duplicated with that described with reference to FIGS. 1 to 13 will be briefly described or omitted.

Referring to FIG. 16, the electronic system 10*c* may include an electronic device 20 and a power transfer device 300', which are spaced apart from each other. The electronic device 20 may be disposed to be spaced apart from the power transfer device 300'. That is, the electronic device 20 may not be in contact with the power transfer device 300'. In other words, the power transfer device 300' may correspond to (e.g., may be) a non-contact charging pad.

The electronic device 20 may receive an electrical signal emitted from the power transfer device 300', and may perform wireless charging based on the electrical signal. In addition, the electronic device 20 may perform wireless communication with the power transfer device 300'. As a distance between the electronic device 20 and the power transfer device 300' is changed, an ASK signal may be transferred from the second mobile device 200 to the power transfer device 300'.

Hereinafter, an electronic system 10*d* according to embodiments will be described with reference to FIG. 17.

Figure 17:
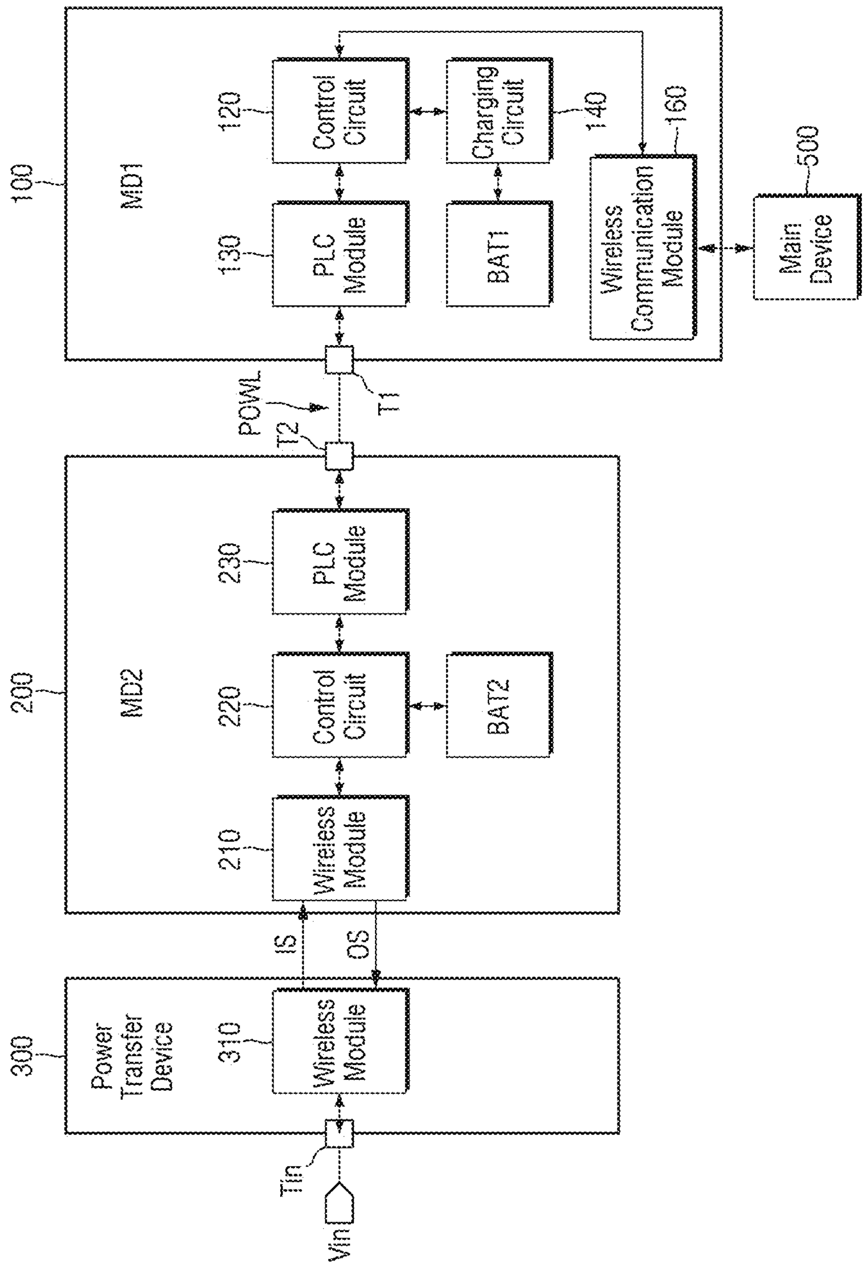
FIG. 17 is a block diagram illustrating an electronic system according to embodiments.

FIG. 17 is a block diagram illustrating an electronic system according to embodiments. For convenience of description, a portion duplicated with that described with reference to FIGS. 1 to 13 will be briefly described or omitted.

Referring to FIG. 17, the electronic system 10*d* may further include a main device 500. In this case, the main device 500 may include an electronic device such as a cellular phone, a PC and a laptop computer. The main device 500 may include a module for performing wireless communication.

The first mobile device 100 may include a wireless communication module 160. The wireless communication module 160 may be connected with the main device 500 to perform wireless communication. The wireless communication module 160 may receive data from the main device 500 and process and output the received data. In addition, the wireless communication module 160 may provide the data received from the main device 500 to the second mobile device 200. That is, the first mobile device 100 and the second mobile device 200 may perform power line communication, and the first mobile device 100 and the main device 500 may perform wireless communication.

Conventional devices that perform wireless communication with a first external device, and power line communication with a second external device, are unable to stably transmit and receive data. Specifically, the conventional devices perform the wireless communication simultaneously or contemporaneously with the power line communication, resulting the introduction of noise from the wireless communication into the power line communication. Accordingly, the conventional devices are unable to stably transmit and/or receive data due to excessive noise in the power line communication.

However, according to embodiments, improved devices are provided for performing wireless communication with a first external device and power line communication with a second external device. For example, the improved devices perform the wireless communication during a first period and perform the power line communication during a second period different from the first period. Accordingly, the improved devices overcome the deficiencies of the conventional devices to prevent or reduce noise in the power line communication, and are thus able to stably transmit and/or receive data.

According to embodiments, operations of the methods described herein, such as those described as being performed by the electronic system 10, the electronic device 20, the power transfer device 300, the first mobile device 100, the second mobile device 200, the control circuit 120, the PLC module 130, the charging circuit 140, the wireless module 210, the control circuit 220, the PLC module 230, the wireless module 310, the converter 221, the regulator 222, the control module 223, the voltage modulator V_MOD, the current demodulator I_DEM, the current modulator I_MOD, the voltage demodulator V_DEM, the electronic system 10*a*, the power management integrated circuit 150, the power management integrated circuit 240, the electronic system 10*b*, the direct charging module 250, the direct charging module 320, the electronic system 10*c*, the power transfer device 300', the electronic system the wireless communication module 160 and/or the main device 500 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Although embodiments of the present disclosure have been described with reference to the accompanying drawings, it will be apparent to those skilled in the art that the present disclosure may be manufactured in various forms without being limited to the above-described examples and may be embodied in other specific forms without departing from technical spirits and essential characteristics of the present disclosure. Thus, the above examples are to be considered in all respects as illustrative and not restrictive.

What is claimed is:

1. An electronic system comprising:

an ear bud including a first battery;

a cradle directly connected with the ear bud through a power line, the cradle including a second battery; and a charging pad adjacent to the cradle, wherein the cradle is configured to, provide an amplitude shift keying (ASK) signal to the charging pad for a first time period, the ASK signal being generated using a voltage of the second battery, and provide a pogo voltage to the ear bud through the power line for a second time period, the pogo voltage including a data signal generated using the voltage of the second battery, and the first time period not overlapping the second time period.

2. The electronic system of claim 1, wherein the charging pad is in contact with the cradle.

3. The electronic system of claim 1, wherein the first battery and the second battery are charged at the same time.

4. The electronic system of claim 1, wherein the ear bud is configured to:

generate a pogo current including a signal responding to the data signal; and provide the pogo current to the power line.

5. The electronic system of claim 1, wherein the cradle is configured to charge the second battery based on a wireless signal received from the charging pad.

6. The electronic system of claim 5, wherein the cradle is further configured to perform charge the second battery based on a wired signal received from the charging pad.

7. The electronic system of claim 1, wherein the cradle is configured to receive a frequency shift keying (FSK) signal from the charging pad for a third time period that is not overlapped with the first time period or the second time period.

8. The electronic system of claim 1, wherein the cradle is configured to simultaneously perform power line communication with the ear bud and wire communication with the charging pad.

9. The electronic system of claim 1, wherein the ear bud further includes a first power management integrated circuit configured to manage the first battery, and the cradle further includes a second power management integrated circuit configured to manage the second battery.

10. The electronic system of claim 1, further comprising:

a main device configured to perform a wireless communication with the ear bud.

11. An operating method of an electronic system including a first mobile device and a second mobile device, the method comprising:

charging, by the second mobile device, a first battery of the first mobile device by transmitting a first signal to the first mobile device through a wired line for a first time period; and charging, by an external device, a second battery of the second mobile device by transmitting a second signal to the second mobile device using a wireless communication, wherein the second mobile device is configured to transmit a response signal for the second signal to the external device for a second time period, and the first time period is not overlapping the second time period.

12. The method of claim 11, further comprising:

contacting, by the second mobile device, the external device.

13. The method of claim 11, wherein the second signal includes a frequency shift keying (FSK) signal, and the response signal includes an amplitude shift keying (ASK) signal.

14. The method of claim 13, wherein the FSK signal is transmitted from the external device to the second mobile device for a third time period that is not overlapped with the first time period or the second time period.

15. The method of claim 11, wherein the first signal includes a pogo voltage.

16. The method of claim 15, further comprising:

generating, by the first mobile device, a pogo current in response to the pogo voltage.

17. The method of claim 11, wherein charging the first battery and charging the second battery are simultaneously performed.

18. The method of claim 11, wherein the first mobile device is an ear bud; and the second mobile device is a cradle that accommodates the ear bud.

19. The method of claim 11, wherein the first time period is shorter than the second time period.

20. The method of claim 11, further comprising:

charging, by the external device, the second battery of the second mobile device by transmitting a third signal to the second mobile device through a wired power line.

* * * * *